US008907820B2

(12) United States Patent
Ho

(10) Patent No.: US 8,907,820 B2
(45) Date of Patent: Dec. 9, 2014

(54) MANUFACTURING METHOD OF METAL KEYBOARD FOR A COMPUTER

(75) Inventor: Chung-Po Ho, Guangdong (CN)

(73) Assignee: Metalplas Forming Technology (Zhuhai) Ltd., Zhuhai, Guangdong Province (CN)

( * ) Notice: Subject to any disclaimer, the term of this patent is extended or adjusted under 35 U.S.C. 154(b) by 981 days.

(21) Appl. No.: 13/057,474

(22) PCT Filed: Dec. 26, 2008

(86) PCT No.: PCT/CN2008/073765
§ 371 (c)(1),
(2), (4) Date: Feb. 3, 2011

(87) PCT Pub. No.: WO2010/015136
PCT Pub. Date: Feb. 11, 2010

(65) Prior Publication Data
US 2011/0140934 A1    Jun. 16, 2011

(30) Foreign Application Priority Data

Aug. 5, 2008   (CN) .......................... 2008 1 0030015

(51) Int. Cl.
*H03K 17/94* (2006.01)
*H03K 11/00* (2006.01)
*B29B 7/00* (2006.01)
*G06F 3/02* (2006.01)

(52) U.S. Cl.
CPC ................... *G06F 3/0202* (2013.01)

USPC ....................................... 341/22; 264/328.14

(58) Field of Classification Search
USPC ....................................... 341/22; 264/328.14
See application file for complete search history.

(56) References Cited

FOREIGN PATENT DOCUMENTS

| CN | 1707711 A | 12/2005 |
| CN | 1848326 A | 10/2006 |
| CN | 101125459 A | 2/2008 |

*Primary Examiner* — Daniel Wu
*Assistant Examiner* — Mancil Littlejohn, Jr.
(74) *Attorney, Agent, or Firm* — Cheng-Ju Chiang

(57) ABSTRACT

A metal keyboard for a computer and the method thereof are provided. The keyboard includes an aluminum panel in which a plurality of nano-micro-pores is defined by nano-molding process T; a plastic body disposed on the aluminum panel and made through injection molding based on above nano-molding process, one side of the plastic body being combined with the nano-micro-pores and then secured onto the underside of the aluminum panel, while the other side of the plastic body being provided with plural plastic pins which are formed by injection molding and projected from the surface of the plastic body; and a metal key tray in which a number of locating holes are defined at locations corresponding to the plastic pins, these pins passing through the corresponding locating holes, being hardened after hot melting process and finally being locked with the metal key tray. The invention can effectively reduce manufacture cost of the metal keyboard and significantly improve productivity.

1 Claim, 2 Drawing Sheets

MANUFACTURING METHOD OF METAL KEYBOARD FOR A COMPUTER

CROSS REFERENCE TO RELATED APPLICATIONS

The present application is a 35 U.S.C. §371 National Phase conversion of International (PCT) Patent Application No. PCT/CN2008/073765, filed on Dec. 26, 2008, the disclosure of which is incorporated by reference herein. The PCT International Patent Application was published in Chinese.

FIELD OF THE INVENTION

The invention relates to techniques of manufacturing a keyboard for a computer and more particularly, the invention relates to a metal keyboard for a computer and the method for making the same, thus making the manufacture process simple and inexpensive.

BACKGROUND OF THE INVENTION

Keyboards are frequently used peripheral devices for computers and mainly include plastic keyboards and metal keyboards. For a conventional metal keyboard available in current marketplaces, the following components are included: a metal panel, a plurality of keys, a number of key brackets for carrying the keys thereon, a circuit board, a metal key tray and a plastic or metal base plate. A metal keyboard can be constructed by assembling the above components.

During process of assembling the above components to form a metal keyboard, laser welding method is employed to connect all of the metal parts together. For instance, the panel may be connected with the metal key tray by laser welding method. The circuit board and keys may be installed in an interlayer. Finally, the assembled key panel can be secured onto the base plate by means of double-sided tape.

To manufacture the metal keyboard using above laser welding method, each key must be welded for 100-200 times, thus inevitably increasing the cost and lowering the productivity.

SUMMARY OF THE INVENTION

One object of the invention is to provide a metal keyboard for a computer and the method for manufacturing the same, which effectively reduces manufacture cost of the metal keyboard and significantly improves productivity.

To obtain the above object, a metal keyboard for a computer is provided, which includes an aluminum panel in which a plurality of nano-micro-pores is defined by nano-molding process T; a plastic body disposed on the aluminum panel and made through injection molding based on above nano-molding process, one side of the plastic body being combined with the nano-micro-pores and then secured onto the underside of the aluminum panel, while the other side of the plastic body being provided with plural plastic pins which are formed by injection molding and projected from the surface of the plastic body; and a metal key tray in which a number of locating holes are defined at locations corresponding to the plastic pins, these pins passing through the corresponding locating holes, being hardened after hot melting process and finally being locked with the metal key tray.

Preferably, the metal key tray is constructed of a sheet of thin aluminum.

Preferably, the diameter of the plastic pins is commensurate with that of the locating holes.

A metal keyboard for a computer includes a metal panel, a plurality of keys, a number of key brackets, a metal key tray, a circuit board and a base plate. The metal panel is constructed of aluminum. The aluminum panel has a number of nano-micro-pores defined therein using nano-molding techniques T. A plastic body is disposed on the aluminum panel and is made through injection molding based on above nano-molding process, one side of the plastic body being combined with the nano-micro-pores and then secured onto the underside of the aluminum panel, while the other side of the plastic body being provided with plural plastic pins which are formed by injection molding and projected from the surface of the plastic body.

A number of locating holes are defined in the metal key tray at locations corresponding to the plastic pins, these pins passing through the corresponding locating holes, being hardened after hot melting process and finally being locked with the metal key tray.

Preferably, the metal key tray is constructed of a sheet of thin aluminum.

Preferably, the diameter of the plastic pins is commensurate with that of the locating holes.

A method for manufacturing a metal keyboard for a computer includes the following steps:

Processing an aluminum panel via nano-molding technology T such that a number of nano-micro-pores are formed in the panel;

Processing the aluminum panel after the nano-molding such that a plastic body is formed on and secured onto the panel by injection molding, one side of the plastic body being combined with the nano-micro-pores and secured onto the underside of the aluminum panel, while the other side being provided with a plurality of plastic pins which are formed by injection molding and projected from the surface of the plastic body;

Forming a plurality of locating holes in the metal key tray at locations corresponding to the plastic pins;

Making the plastic pins distributed on the plastic body received into the corresponding micro-pores of the metal key tray; and Hardening the plastic pins by hot melting after they are received into the corresponding micro-pores of the metal key tray such that the pins are locked onto the metal key tray.

Preferably, the hot melting process described above is performed by heating the plastic pins using a soldering iron which is of the same area with the aluminum panel and which is pressed against the pins such that the pins are softened.

Preferably, the metal key tray is made of a sheet of thin aluminum. In addition, the diameter of the plastic pins is commensurate with that of the micro-pores.

A method of manufacturing a metal keyboard for a computer includes the steps of manufacturing a keyboard component and then assembling the keyboard component.

The keyboard component contains an aluminum panel, a plurality of keys, a plurality of key brackets, a metal key tray, a circuit board, an enhancement and weight increasing steel plate and a base plate.

The keys are constructed by injection molding or stamping process. The key brackets are formed by injection molding twice and then connecting with each other.

The aluminum panel is formed by the steps of:

performing a stamping process to the sheet of thin aluminum which is used for making the panel;

performing nano-molding process T to the aluminum panel after the stamping process so as to define a plurality of nano-micro-pores on the panel;

processing the aluminum panel after the nano-molding such that a plastic body is formed on and secured onto the panel by injection molding, one side of the plastic body being combined with the nano-micro-pores and secured onto the underside of the aluminum panel, while the other side being provided with a plurality of plastic pins which are formed by injection molding and projected from the surface of the plastic body;

The metal key tray is formed by a stamping process. A number of micro-pores are defined by stamping process in the metal key tray at locations corresponding to the plastic pins;

Making the plastic pins distributed on the plastic body received into the corresponding micro-pores of the metal key tray;

Hardening the plastic pins by hot melting after they are received into the corresponding micro-pores of the metal key tray such that the pins are locked onto the metal key tray, thus forming the aluminum panel and metal key tray.

The base plate is formed by injection molding process.

The key and corresponding key bracket are connected and assembled with each other mechanically.

The key bracket, aluminum panel, and metal key tray are connected and assembled with each other mechanically.

The aluminum panel, metal key tray, and circuit board are connected with each other by means of double-sided tape.

The enhancement and weight increasing steel plate is secured onto the base plate using double-sided tape.

Compared with conventional technology, the present invention can obtain the following technical effects. In the present invention, the aluminum panel has a number of nano-micro-pores formed thereon using nano-molding technologies T; the aluminum panel also has a plastic body formed on its underside by injection molding based on nano-molding technology. One side of the plastic body is combined with the nano-micro-pores and then secured onto the underside of the aluminum panel, while the other side of the plastic body is provided with plural plastic pins which are formed by injection molding and projected from the surface of the plastic body. The metal key tray has a number of locating holes defined at locations thereof corresponding to the plastic pins, these pins passing through the corresponding locating holes, being hardened after hot melting process and finally being locked with the metal key tray. The panel and key tray are combined with each other by melting plastic material, thus effectively reducing manufacture cost of the metal keyboard and significantly improving productivity.

DETAILED DESCRIPTION OF THE INVENTION

The main ideas of the invention lie in improvements to conventional manufacture process of a metal keyboard and the construction of the keyboard. By way of nano-molding technology (NMT), locating and fastening construction is defined on the aluminum panel using technology of surface-combining two different materials. Moreover, hot melting method is employed to secure the aluminum panel onto the metal key tray. In summary, the invention provides a novel solution for fabricating a keyboard component. Various embodiments of the invention will be discussed below in great detail.

Figure 1:
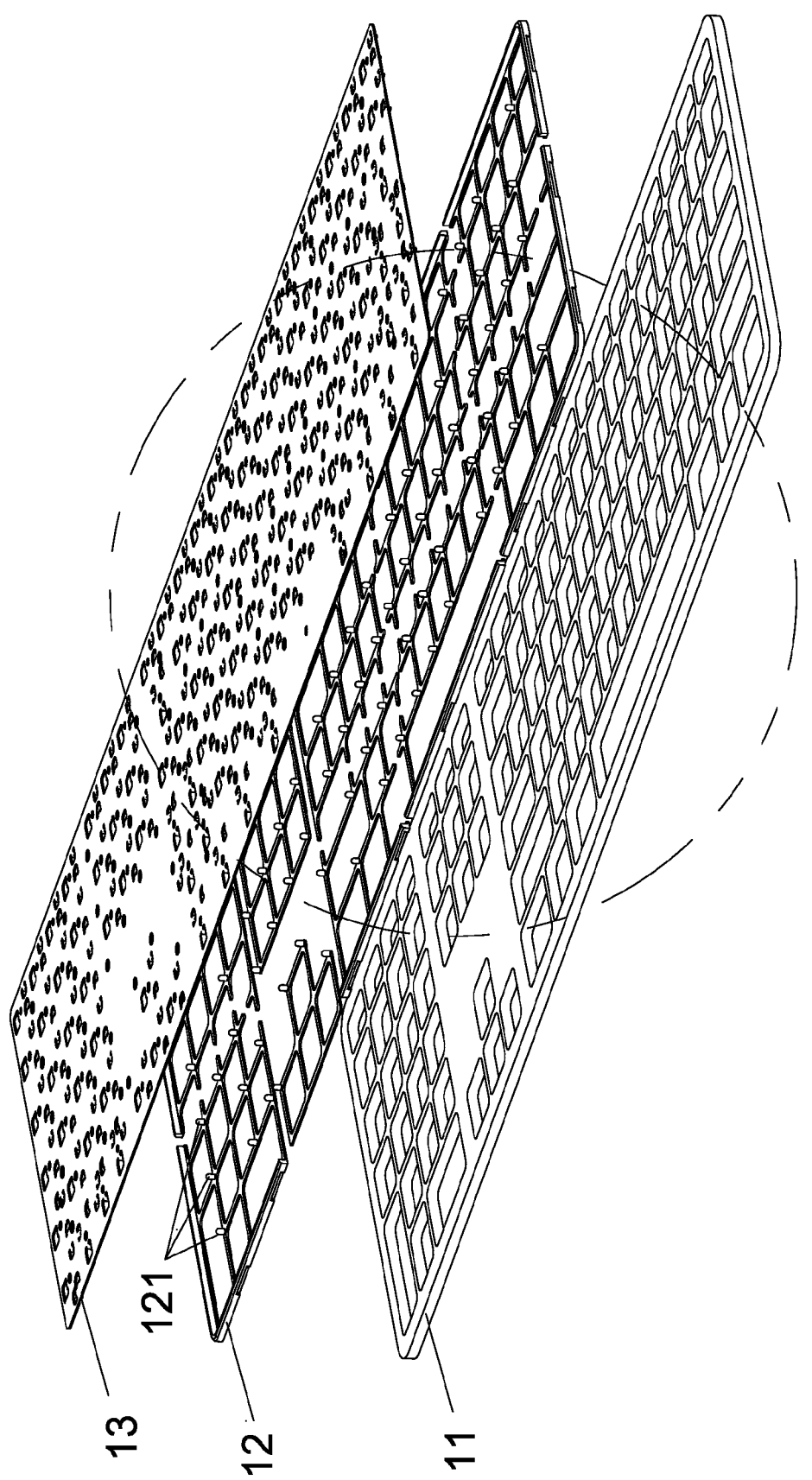
FIG. 1 shows a structural view of a metal keyboard according to an embodiment of the invention.

Reference is made to FIG. 1 which illustrates construction of a metal keyboard component according to an embodiment of the invention. In the embodiment shown, the metal keyboard component mainly includes an aluminum panel 11, a plastic body 12 formed on the panel 11 and a metal key tray 13.

The aluminum panel 11 has a number of nano-micro-pores defined therein using nano-molding technologies (NMT).

The plastic body 12 is formed on the aluminum panel 11 by injection molding method based on nano-molding technologies. One side of the plastic body 12 is combined with the nano-micro-pores and then secured onto the underside of the aluminum panel 11. Furthermore, the other side of the plastic body 12 is provided with plural plastic pins 121 which are formed by injection molding and projected from the surface of the plastic body 12. It should be noted that the plastic body 12 formed by injection molding method may be integrally formed part. In other words, the plastic body 12 may be in the form of a plastic layer provided on the aluminum panel 11. The plastic body 12 may also be in the form of multiple individual plastic bodies. Additionally, the plastic body 12 may be secured on the aluminum panel 11 at locations corresponding to the keys distribution in order that the plastic body 12 will be fastened onto the metal key tray firmly. The plastic pins 121 may be evenly arranged according to the distribution of the keys.

A number of locating holes are defined in the metal key tray 13 at locations corresponding to the plastic pins 121, these pins 121 passing through the corresponding locating holes of the tray 13, being hardened after hot melting process and finally being locked with the metal key tray 13.

It should be noted that the metal key tray 13 of the embodiment may be made from a sheet of thin aluminum. In actual applications, other metal sheet may also be utilized to form the metal key tray 13 without any loss of its technical effects and therefore, description thereof is omitted herefrom for clarity.

Moreover, it should be noted that the diameter of the plastic pins is commensurate with that of the micro-pores. Preferably, the plastic pin 121 passes through the micropore and is projected from the metal key tray 13.

Now a method for manufacturing the metal keyboard component is described. The method may include the following steps.

At first, an aluminum panel is processed via nano-molding technology T such that a number of nano-micro-pores are formed in the panel. More specifically, the aluminum panel may be fabricated by stamping a sheet of thin aluminum. Thereafter, the aluminum panel is processed using nano-molding technologies T, i.e., the panel is roughened by chemical method so as to form micro-pores therein.

Next, the aluminum panel is processed after the nano-molding such that a plastic body is formed on and secured onto the panel by injection molding. Specifically, the aluminum panel is placed into a plastic mould and then is injection-molded such that one side of the plastic body is combined with the nano-micro-pores and secured onto the underside of the aluminum panel, while the other side is provided with a plurality of plastic pins which are formed by injection molding and projected from the surface of the plastic body.

Additionally, in the present invention, a plurality of locating holes is also defined in the metal key tray at locations corresponding to respective plastic pins. These locating holes have the diameter consistent with that of the plastic pins.

During assembling procedure, plastic pins arranged on the plastic body are inserted into corresponding locating holes of the metal key tray. The plastic pins, which are inserted into corresponding locating holes of the key tray, are hardened by hot-melting method so as to be locked onto the metal key tray. Specifically, hot-melting of the locating holes passed through corresponding locations on the key tray may be realized by using soldering iron which has the same area as the aluminum panel. The plastic pins are heated by the soldering iron which is pressed against the pins such that the pins are softened. After that, a hardening procedure is performed.

Figure 2:
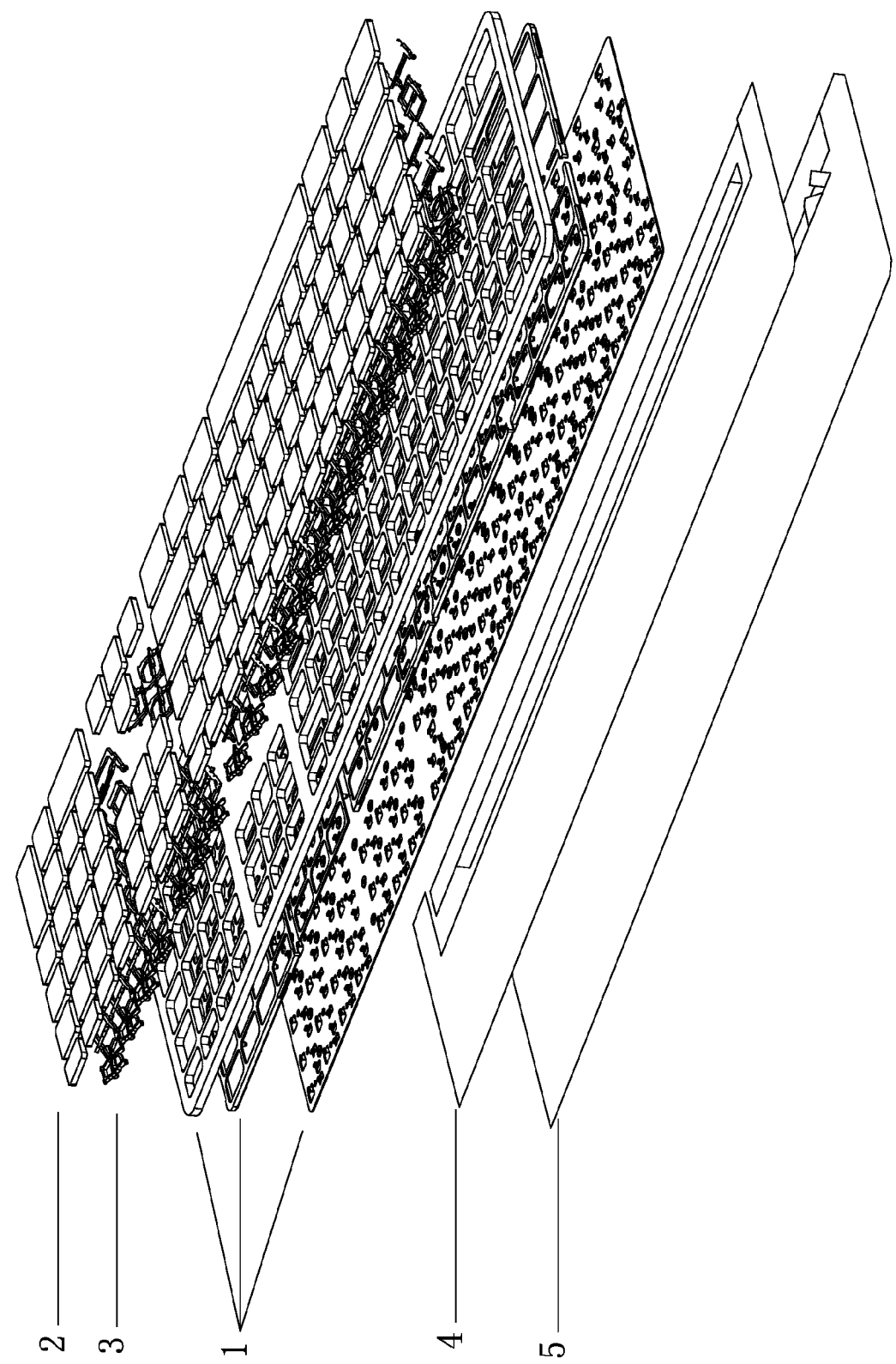
FIG. 2 shows a structural view of a metal keyboard for a computer according to an embodiment of the invention.

With reference to FIG. 2 showing construction of a metal keyboard for a computer assembled with the above keyboard component, the metal keyboard for a computer includes a metal panel and metal key tray component 1, a plurality of keys 2, a number of key brackets 3 for carrying the keys thereon, a circuit board 4 and a base plate 5. The metal keyboard 11 may be made from aluminum. Moreover, the structure of the aluminum panel and metal key tray component 1 may be implemented with the structure as described above, thus reducing the manufacture cost and improving productivity of the keyboard. Description thereof is omitted herefrom.

A method for manufacturing the metal keyboard described above is discussed below in greater detail.

According to one embodiment of the invention, the method includes the following steps.

Firstly, a keyboard component is fabricated.

The keyboard component of the embodiment may include an aluminum panel, a plurality of keys, a plurality of key brackets, a metal key tray, a circuit board, an enhancement and weight increasing steel plate and a base plate.

According to the embodiment, the keys are constructed by injection molding or stamping process. The key brackets are formed by injection molding twice and then connecting with each other. For example, they can be formed injection molding twice using PA material and then connecting with each other. In actual applications, other kinds of plastic material may also be taken and therefore, description thereof is also omitted.

The aluminum panel may be formed by the following steps.

1) Performing a stamping process to the sheet of thin aluminum which is used for making the panel;

2) Performing nano-molding process T to the aluminum panel after the stamping process so as to define a plurality of nano-micro-pores on the panel; and 3) Processing the aluminum panel after the nano-molding such that a plastic body is formed on and secured onto the panel by injection molding, one side of the plastic body being combined with the nano-micro-pores and secured onto the underside of the aluminum panel, while the other side being provided with a plurality of plastic pins which are formed by injection molding and projected from the surface of the plastic body.

In addition, the metal key tray in this embodiment may be formed by a stamping process. A number of micro-pores are defined by stamping process in the metal key tray at locations corresponding to the plastic pins.

During assembling procedure, the plastic pins distributed on the plastic body are received into the corresponding micro-pores of the metal key tray. The plastic pins are hardened by hot melting after they are received into the corresponding micro-pores of the metal key tray such that the pins are locked onto the metal key tray, thus forming the aluminum panel and metal key tray.

The base plate may be formed by an injection molding process.

Secondly, the keyboard component is assembled.

The entire assembling process may be performed as follows.

1) The key and corresponding key bracket are connected and assembled with each other mechanically;

2) The key bracket, aluminum panel, and metal key tray are connected and assembled with each other mechanically;

3) The aluminum panel, metal key tray, and circuit board are connected with each other by means of double-sided tape; and 4) The enhancement and weight increasing steel plate is secured onto the base plate using double-sided tape.

What disclosed is only preferred embodiment of the invention, and it is not intended to limit the scope of the invention to such embodiments. The invention covers all these equivalent changes made according to the invention.

What is claimed is:

1. A method for manufacturing a metal keyboard for a computer, comprising the steps of manufacturing a keyboard component and then assembling the keyboard component; wherein the keyboard component contains an aluminum panel, a plurality of keys, a plurality of key brackets, a metal key tray, a circuit board, an enhancement and weight increasing steel plate and a base plate; and wherein the keys are constructed by injection molding or stamping process; the key brackets are formed by injection molding twice and then connecting with each other;

the aluminum panel is formed by the steps of:

performing a stamping process to the sheet of thin aluminum which is used for making the panel;

performing nano-molding process T to the aluminum panel after the stamping process so as to define a plurality of nano-micro-pores on the panel;

processing the aluminum panel after the nano-molding such that a plastic body is formed on and secured onto the panel by injection molding, one side of the plastic body being combined with the nano-micro-pores and secured onto the underside of the aluminum panel, while the other side being provided with a plurality of plastic pins which are formed by injection molding and projected from the surface of the plastic body;

the metal key tray is formed by a stamping process, a number of micro-pores are defined by stamping process in the metal key tray at locations corresponding to the plastic pins;

making the plastic pins distributed on the plastic body received into the corresponding micro-pores of the metal key tray;

hardening the plastic pins by hot melting after they are received into the corresponding micro-pores of the metal key tray such that the pins are locked onto the metal key tray, thus forming the aluminum panel and metal key tray;

the base plate is formed by injection molding process;

the key and corresponding key bracket are connected and assembled with each other mechanically;

the key bracket, aluminum panel, and metal key tray are connected and assembled with each other mechanically;

the aluminum panel, metal key tray, and circuit board are connected with each other by means of double-sided tape; and the enhancement and weight increasing steel plate is secured onto the base plate using double-sided tape.

\* \* \* \* \*